US006254270B1

(12) United States Patent
Agnoff

(10) Patent No.: US 6,254,270 B1
(45) Date of Patent: Jul. 3, 2001

(54) ORBITAL WATCH-WINDING APPARATUS

(75) Inventor: Charles Agnoff, Wilmington, NC (US)

(73) Assignee: Orbita Corporation, Wilmington, NC (US)

( * ) Notice: Subject to any disclaimer, the term of this patent is extended or adjusted under 35 U.S.C. 154(b) by 0 days.

(21) Appl. No.: 09/168,818

(22) Filed: Oct. 8, 1998

Related U.S. Application Data

(63) Continuation-in-part of application No. 08/762,322, filed on Dec. 9, 1996.

(51) Int. Cl.[7] .............................. G09B 3/00; G09D 3/00; B01F 11/00

(52) U.S. Cl. ............................................... 368/206; 81/7.5

(58) Field of Search .................................... 368/206–209; 81/7.5

(56) References Cited

U.S. PATENT DOCUMENTS 2,863,345 * 12/1958 Flechter .
2,917,955 * 12/1959 Leger .
2,926,519 * 3/1960 Setterberg .
3,620,007 * 11/1971 Kauffman .

FOREIGN PATENT DOCUMENTS 19535229A 4/1997 (DE) .
52043457 5/1977 (EP) .
1111998 11/1954 (FR) .
2233477A 1/1991 (GB) .

* cited by examiner

*Primary Examiner*—Vit Miska
(74) *Attorney, Agent, or Firm*—Coats & Bennett, PLLC

(57) ABSTRACT

An orbital watch-winding apparatus includes a base unit and a mandrel rotatably mounted to the base unit. The mandrel is inclined at an angle with respect to a horizontal plane. A watch is supported on the outer surface of the mandrel so that it is radially spaced from the axis of rotation. When activated, the watch moves in a circular path about the inclined axis of rotation. The orbital motion of the watch about the inclined axis causes the self-winding mechanism to swing back and forth to simulate the effect produced by normal arm movements when the watch is worn by a user.

17 Claims, 9 Drawing Sheets

ORBITAL WATCH-WINDING APPARATUS

RELATED APPLICATION

This application is a continuation in part of U.S. application Ser. No. 08/762,322 filed Dec. 9, 1996.

FIELD OF THE INVENTION

The present invention relates generally to self-winding watches, and, more particularly, to an automatic watch-winding apparatus for keeping a self-winding watch wound during periods of non-use.

BACKGROUND OF THE INVENTION

Mechanical wrist watches employ spring wound mechanisms which convert the stored energy of the spring into mechanical movement of the watch's hands. Typically, such watches must be hand wound every two or three days to assure continuous operation. If the user forgets to wind the watch, the spring motor will eventually unwind causing the watch to cease operation.

Self-winding mechanisms are known for keeping a mechanical wrist watch wound while it is worn by a user. Most self-winding mechanisms employ a rotary pendulum mechanism for winding the spring motor. The random arm movements of the user as he or she engages in normal day-to-day activities causes the pendulum to swing back and forth. The motion of the pendulum is used to wind the spring. The spring motor stores sufficient energy to keep the watch operating overnight, whether worn or not. Thus, the daily use of the watch will be sufficient to maintain continuous operation without the need to manually wind the watch spring.

It is not uncommon for a person to own more than one watch. For example, a person may have a stainless steel watch which is used for sports events, a second watch for normal daytime use, and a third watch for evening or formal events. Consequently, there may be significant periods of time during which a particular watch is not used. Unless the owner remembers to manually wind the watches, the spring motor will eventually unwind and the watch will cease operation. The task of keeping multiple watches wound and operating is an inconvenience. For this reason, many people depend on a watch winder to keep their watches wound during periods of non-use.

BRIEF DESCRIPTION OF PRIOR ART

A watch winder is a powered device which is designed to keep a self-winding watch fully wound thereby eliminating the need for manual rewinding and resetting. Prior art watch winders typically comprise an electric motor which drives a spindle. The spindle terminates in one or more c-shaped brackets over which the watch band is fitted. When activated, the watch rotates continuously in one or two opposite directions with the axis of rotation being coincident with the center of the watch face. Thus, the watch rotates in the same plane as do the hands of the watch. Some versions employ timers so that the winding action is not continuous and winding occurs only a portion of the time.

The 360° rotational motion of the watch is far different from the normal arm movement of a person as he or she engages in day-to-day activities. A person's arm normally swings through an arc of 120° or less when walking or engaging in other normal day-to-day activities. The unnatural motion of the rotational watch winder substantially increases the amount of wear on the winding mechanism and may eventually lead to malfunctioning or inaccurate timepieces.

SUMMARY OF THE INVENTION

The present invention is a method and apparatus for keeping a self-winding watch wound during periods of non-use. The present invention departs from the prior art practice of mounting the watches for rotational movement. Instead, the watch is fitted over a conical, cylindrical or shaped mandrel so that the watch space is radially spaced from the axis of rotation of the mandrel. The mandrel is driven at a low speed by an electric motor. When the winding apparatus is activated, the watch body moves in a circular path around the axis of rotation of the mandrel. In the preferred embodiment of the invention, the axis of rotation is disposed at an angle of approximately 30° from a horizontal plane. The orbital motion of the watch about the inclined axis causes the rotary pendulum in the self-winding mechanism to swing back and forth thereby replicating the effect of a person's natural arm movements. When a 30° angle from horizontal is chosen, each rotation causes the rotary pendulum to move through an arc of 120°.

Multiple watches may be placed on a single mandrel so there is no need for separate winding apparatuses for each watch. For most watch owners, a winding device with a single mandrel will be sufficient. For retailers or collectors with large numbers of watches, a winding apparatus with multiple mandrels and independent motors can be used.

DETAILED DESCRIPTION OF THE DRAWINGS

Figure 1:
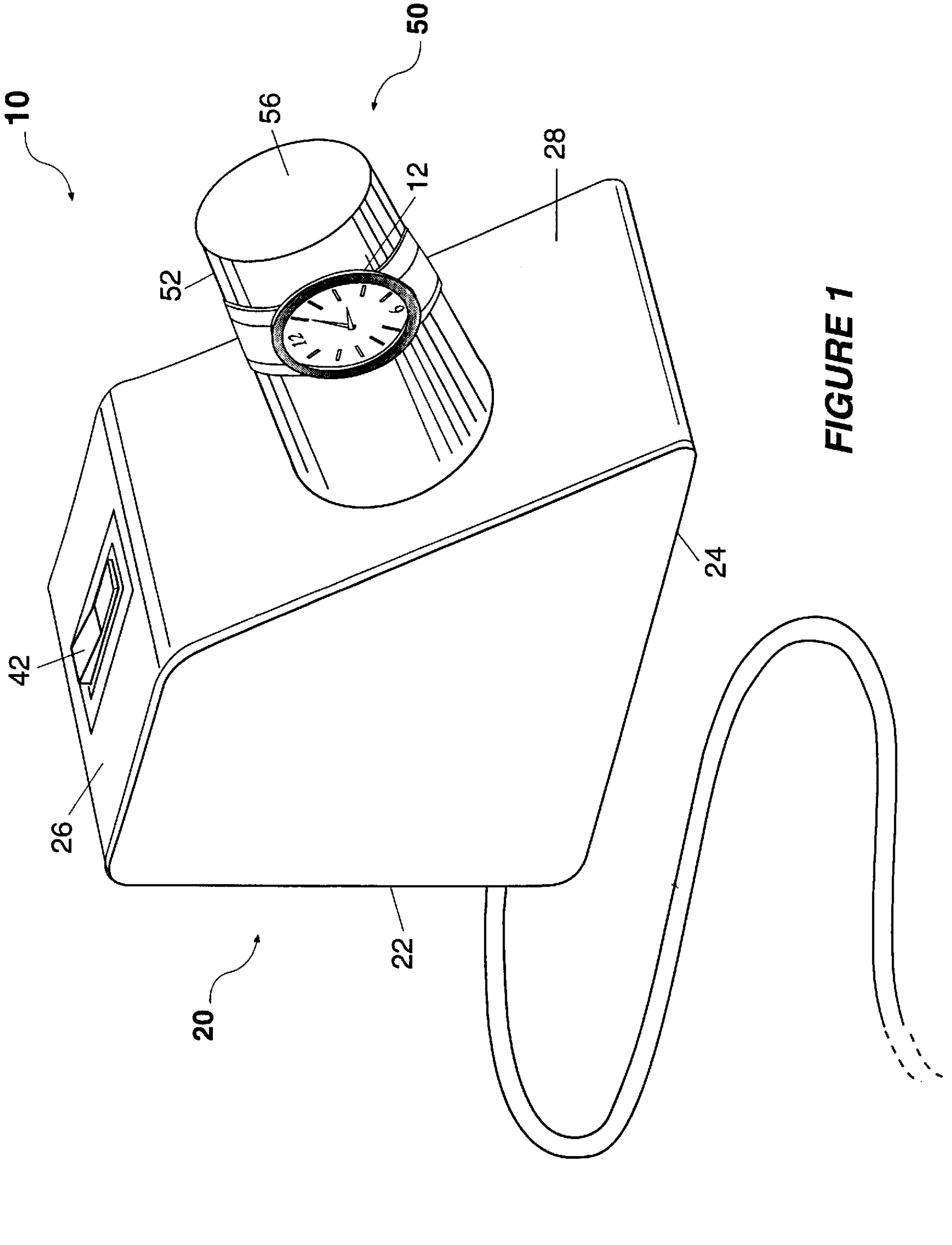
FIG. 1 is a perspective view of the orbital watch winder of the present invention.
Figure 2:
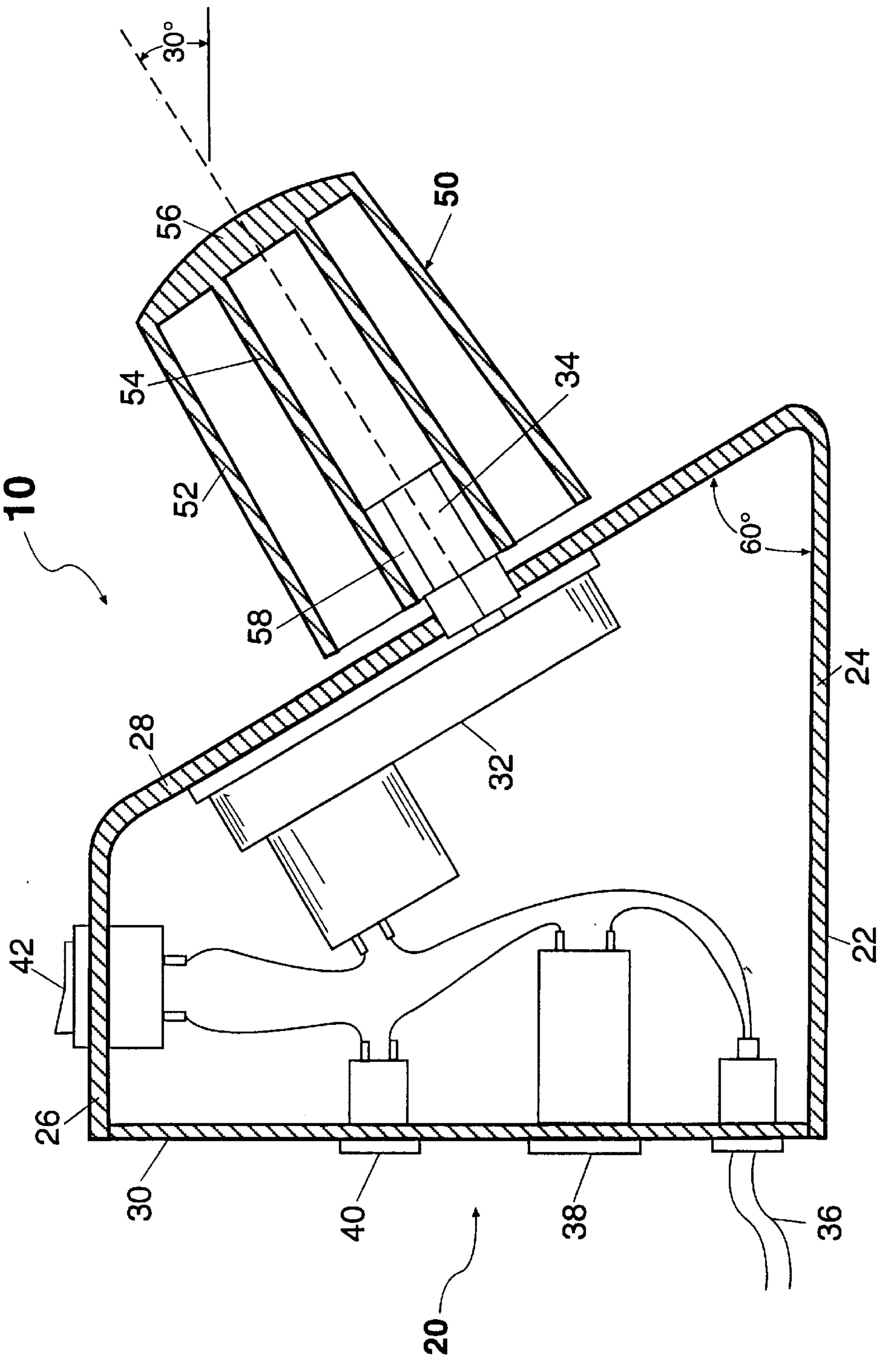
FIG. 2 is a section view of the orbital watch winder.
Figure 3:
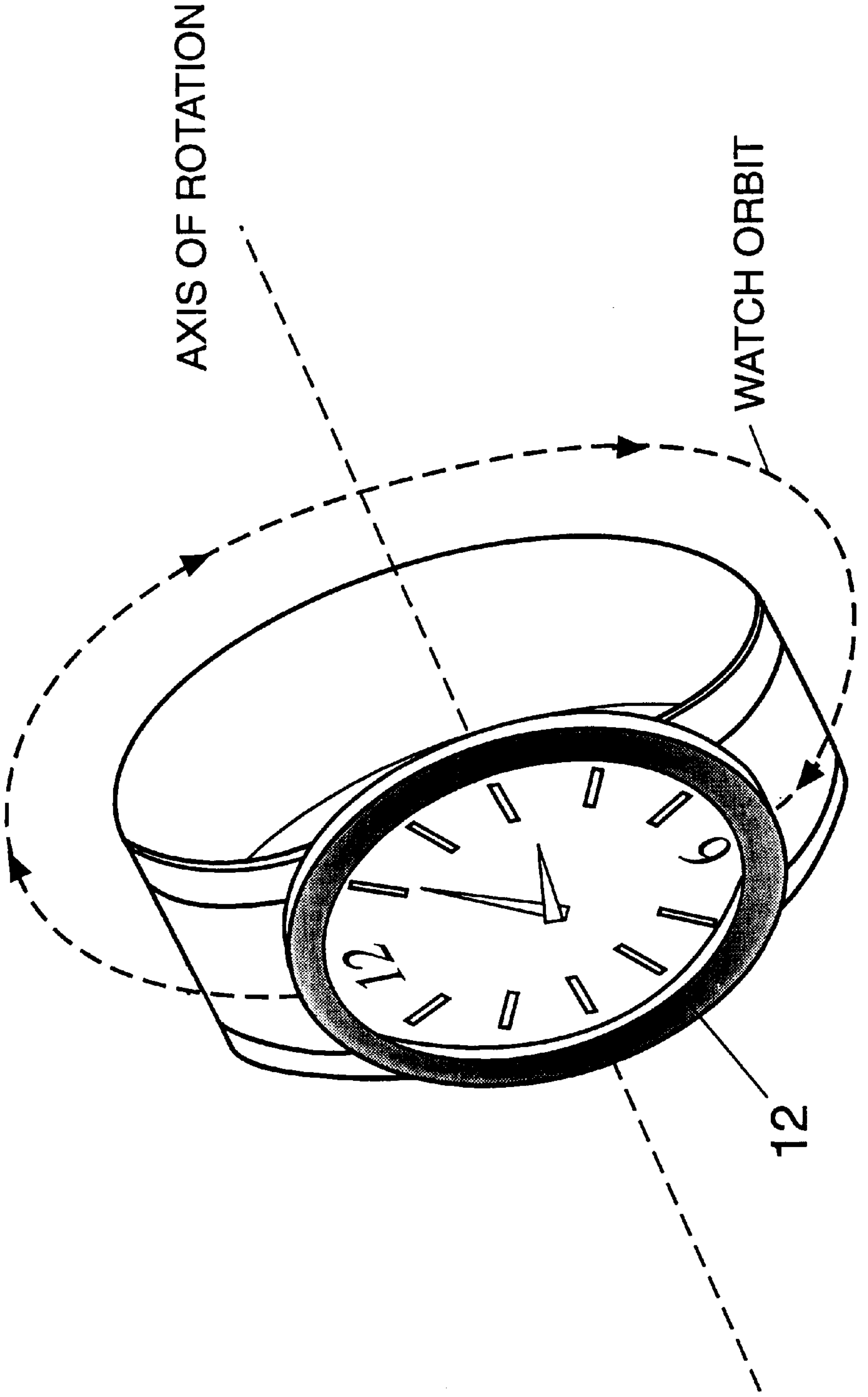
FIG. 3 is a schematic illustration showing the orbital motion of the watch produced by the orbital watch winder.

Referring now to the drawings, and particularly to FIG. 1, the watch winding apparatus of the present invention is shown therein and indicated generally by the number 10. The orbital watch winder includes a base unit indicated generally at 20, and a mandrel indicated generally at 50.

The base unit 20 includes a housing 22 having a bottom panel 24, a top panel 26, a front panel 28, and a back panel 30. The front panel 28, on which the mandrel 50 is mounted, is inclined at an angle of approximately 60° from a horizontal plane. The back panel 30 is removable to provide access to the interior of the housing 22. The housing 22 contains an electrically powered gearmotor 32. The output shaft 34 of the gearmotor 32 passes through an opening in the front panel 28 of the housing 22. The mandrel 50 mounts on the output shaft 34 as will be hereinafter described. The output shaft 34 is preferably perpendicular to the front panel 28. Thus, the axis of rotation of the mandrel 50 is inclined at a 30° angle with respect to a horizontal plane.

The mandrel 50 includes a cone-shaped outer wall 52 and a cylindrical column 54. The mandrel 50 is widest at the end adjacent the base, i.e., the base end, and tapers inwardly towards the outer end 56. The column 54 extends from the outer end 56 to the base end along the center line of the mandrel 50. A bushing 58 is inserted into the column 54 adjacent the base end of the mandrel 50. The output shaft 34 of the gearmotor 32 frictionally fits into the bushing 58. Torque is transmitted by friction from the output shaft 34 to the bushing 58 and from the bushing 58 to the mandrel 50.

Power for the electric gearmotor 32 is supplied by a power cord 36. The power cord 36 plugs into a conventional 115 or 230 volt AC outlet. Alternately, power could be supplied by batteries (not shown). Fuse 38 protects the gearmotor 32 against excessive current. A single-pole, double-throw switch 42 is used as an on/off switch for the gearmotor 32. An optional reversing and cycling control 40 causes the gearmotor 32 to operate intermittently when the on/off switch 42 is turned on. The reversing and cycling control may also cause the gearmotor 32 to reverse periodically.

In use, a watch 12 is inserted over the end of the mandrel 50 and pushed downward on the mandrel 50 until it grips the outer surface of the mandrel 50. Multiple watches 12 can be placed on the mandrel 50 at the same time. The tapered configuration of the mandrel 50 makes it easier to insert and remove the watches onto the mandrel 50, particularly for watches having leather bands that do not stretch. When the watch 12 is inserted onto the mandrel 50, the watch body is radially spaced from the axis of rotation of the mandrel 50. Consequently, when the mandrel 50 rotates, the watch body orbits in a circular path around the axis of rotation of the mandrel 50. The watch 12 maintains the same radial spacing from the axis of rotation throughout its entire orbit. This orbital motion of the watch 12 causes the rotary pendulum in the winding mechanism to rotate through an arc of approximately 1200.

Figure 4:
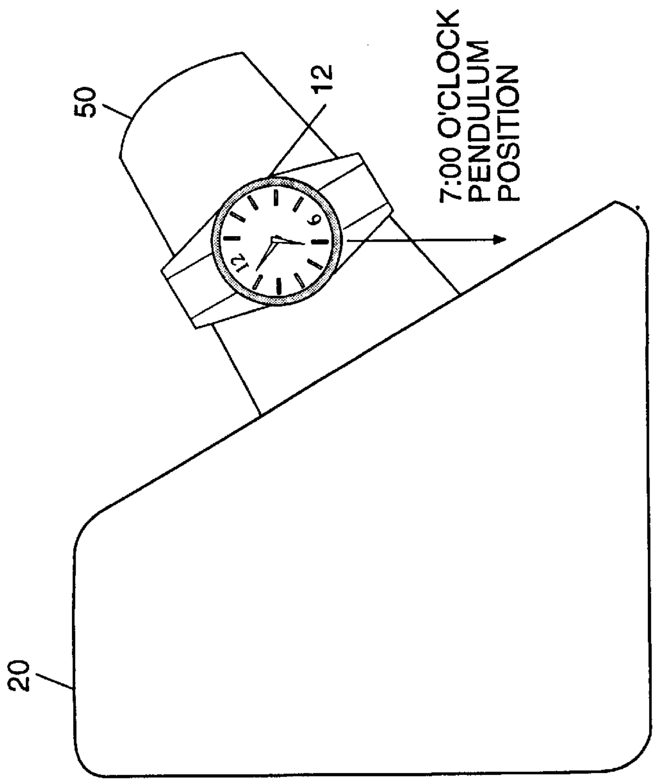
FIG. 4 is a right side elevation view of the orbital watch winder.
Figure 5:
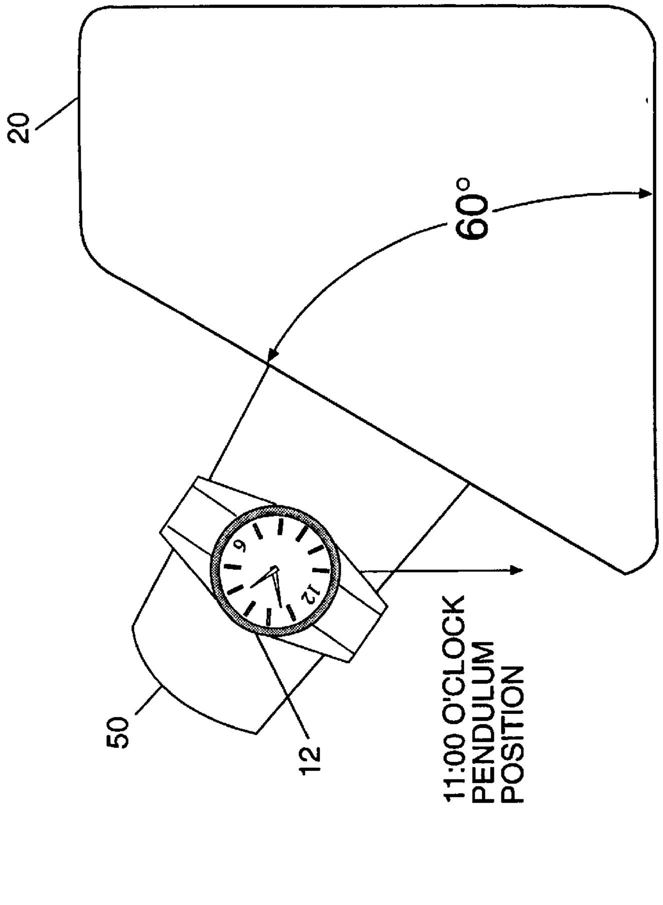
FIG. 5 is a left side elevation view showing the same orbital watch winder after 180° of rotation.

The 120° swinging motion of the pendulum is best illustrated in FIGS. 4 and 5. As shown in FIG. 4, the pendulum, which is represented by an arrow, is at a 7 o'clock position. FIG. 5 shows the same watch after the mandrel 50 has rotated 180°. As seen in FIG. 5, the pendulum is now at the 11 o'clock position. As the mandrel 50 rotates from the position shown in FIG. 4 to the position shown in FIG. 5, the pendulum swings from the 7 o'clock position to the 11 o'clock position. Similarly, when the mandrel 50 rotates from the position shown in FIG. 5 back to the position shown in FIG. 4, the pendulum swings back to the 7 o'clock position. This four hour swinging motion correlates to 120° of rotation.

Figure 6:
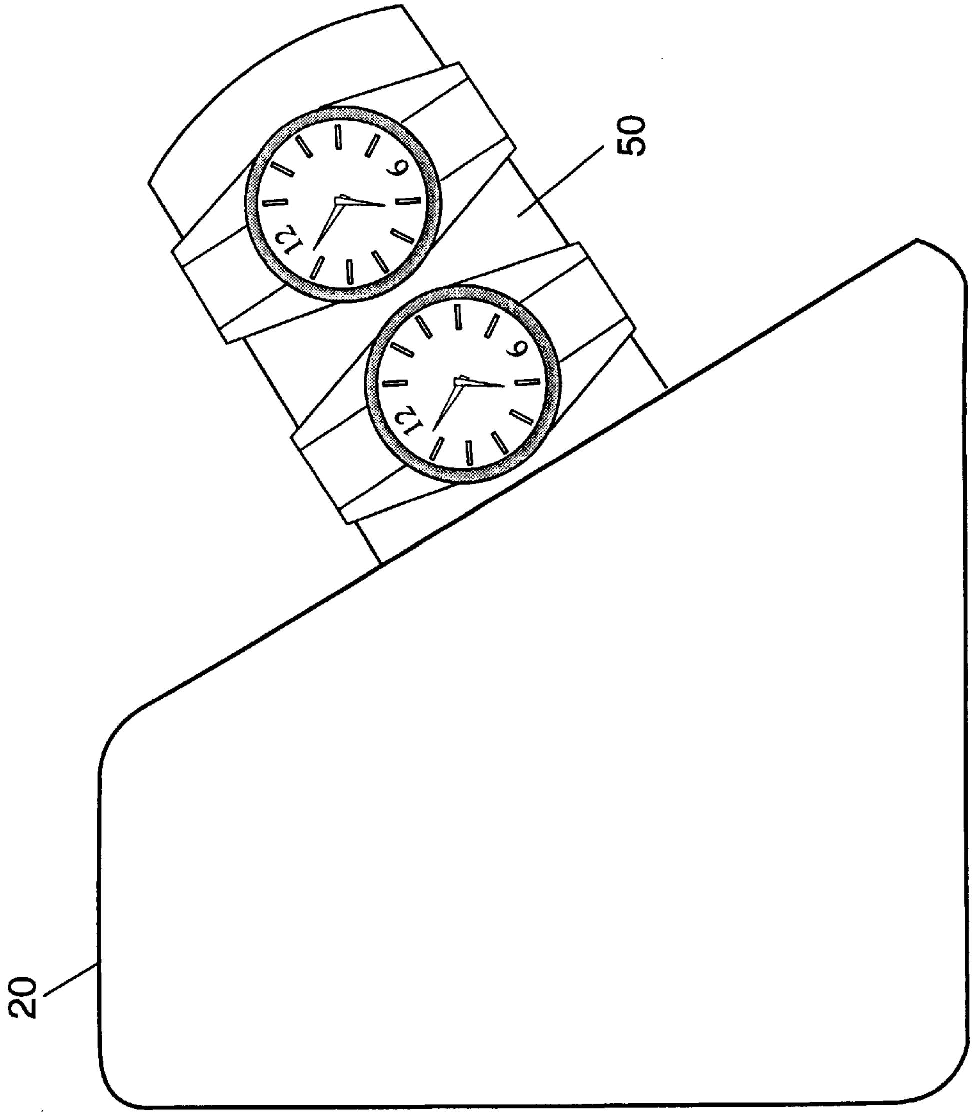
FIG. 6 is a side elevation view showing an alternate embodiment of the watch winder.
Figure 8:
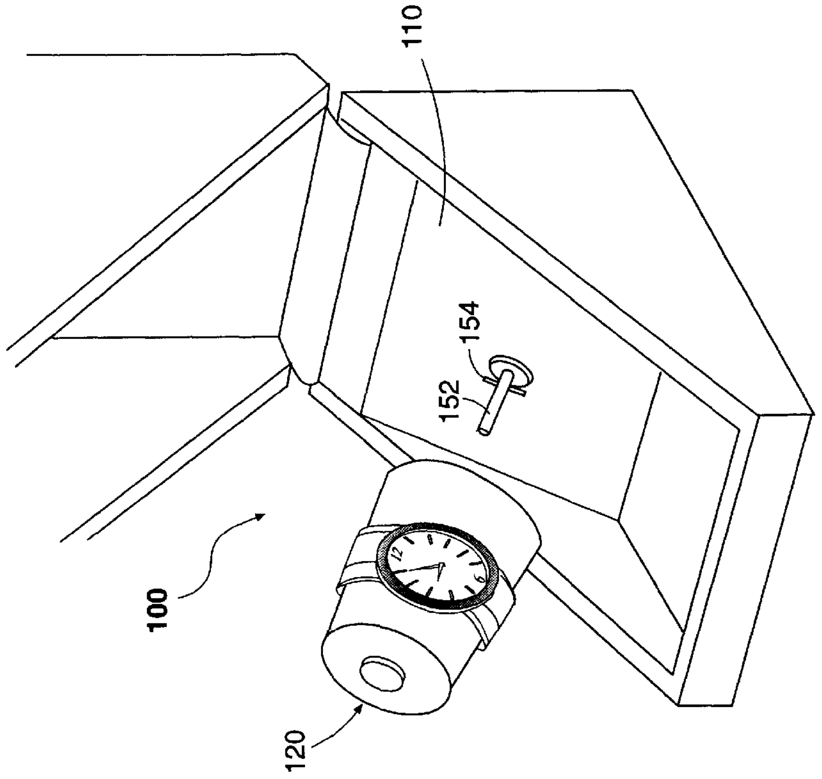
FIGS. 7–12 show an alternate embodiments of the invention.
Figure 7:
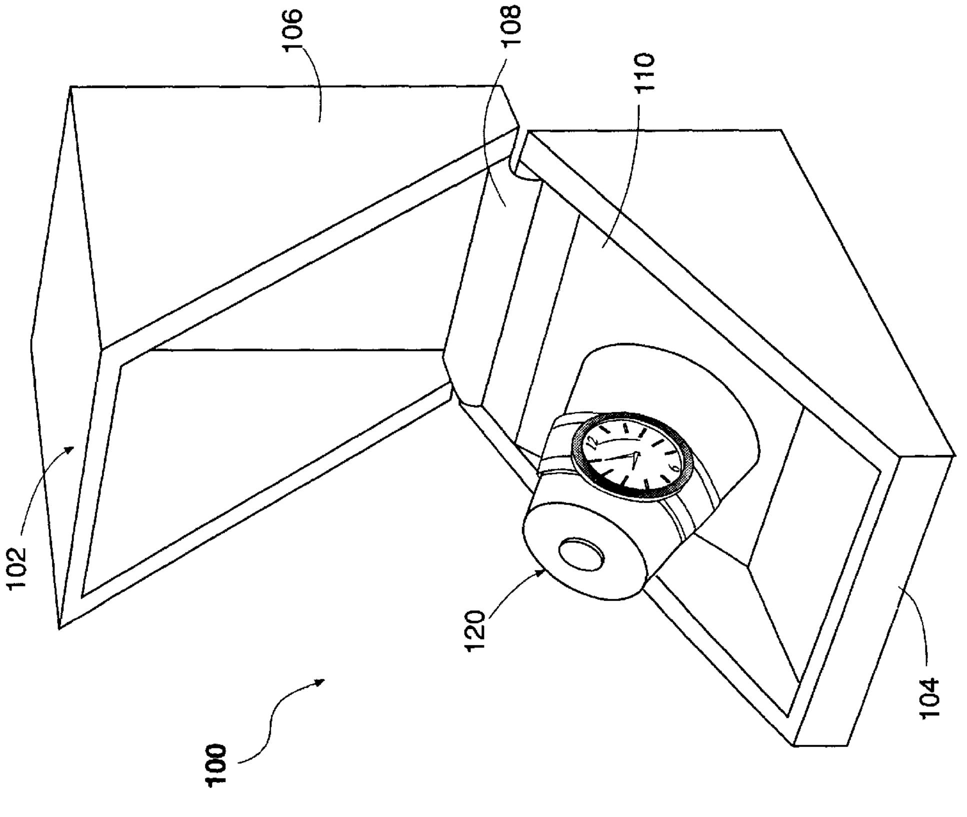

Referring to FIG. 6, an alternate embodiment of the watch winder 10 is shown. The watch winder 10 shown in FIG. 6 is the same in all respects to the first embodiment with the exception of the mandrel 50. In the embodiment shown in FIG. 6, the mandrel 50 has a cylindrical rather than conical form. Further, the outer surface of the mandrel is covered by a compressible material such as a closed-cell or open-cell foam material. The foam material is compressed slightly by the watch band when the watch 12 is placed on the mandrel 50.

Figure 9:
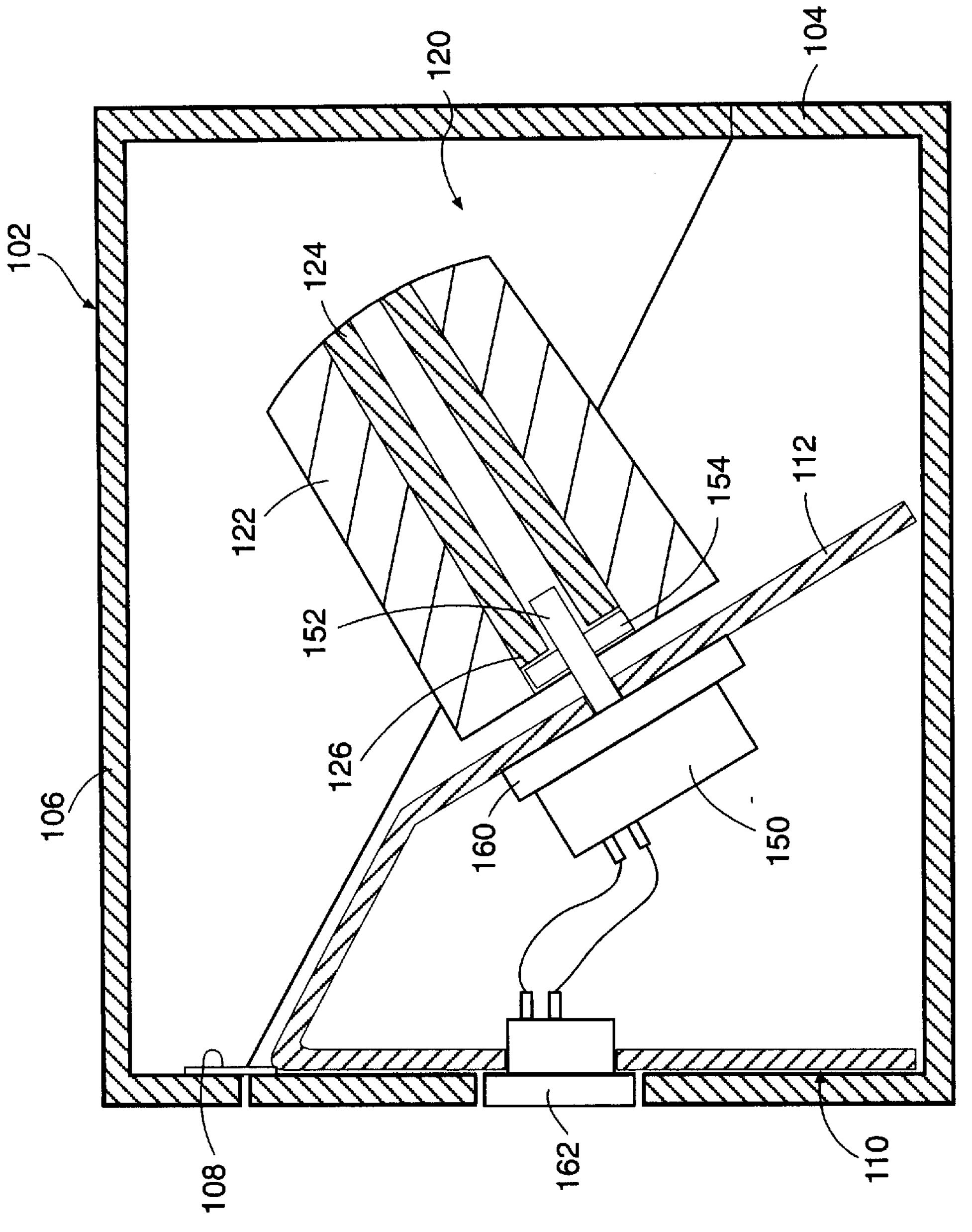

FIGS. 7–12 show an alternate embodiment of the present invention indicated generally by the numeral 100. The embodiment shown in FIGS. 7–12 includes a wooden case 102, a metal support plate 110 disposed within the case 102, and a watch holder 120, 130. The case 102 includes a bottom portion 104 and a lid 106 attached by a hinge 108 to the bottom portion 104. The support plate 110 has a generally inverted u-shaped configuration, as best seen in FIG. 9, and fits inside the case 102. The support plate 110 includes an inclined front surface 112 on which an electric motor 150 and slip clutch 160 are mounted. A power plug 162 mounts to a back wall of the support plate 1 10 and is connected to the electric motor 150. A drive spindle 152 projects from the slip clutch 160 through the front surface 112 of the support plate 110. The drive spindle 152 includes a drive pin 154 for driving the watch holder 120, 130 as will be hereinafter described. The slip clutch 160 is disposed between the electric motor 150 and the drive spindle 152 to allow the watch to be placed on or removed from the holder 120, 130 without first turning off the motor 150.

The watch holder may comprise a mandrel type holder 120 or a cup type holder 130. The mandrel type holder, shown in FIGS. 7–9, comprises a cone 122 made of foam disposed around a metal core 124. The metal core 124 is hollow and has two slots 126 in the bottom end thereof. The holder 120 fits over the drive spindle of the motor. The two slots 126 align and register with the drive pin on the drive spindle 152. The torque applied by the motor 150 is transferred by the drive pin 154 to the watch holder 120 to rotate the watch holder 120, 130.

Figure 10:
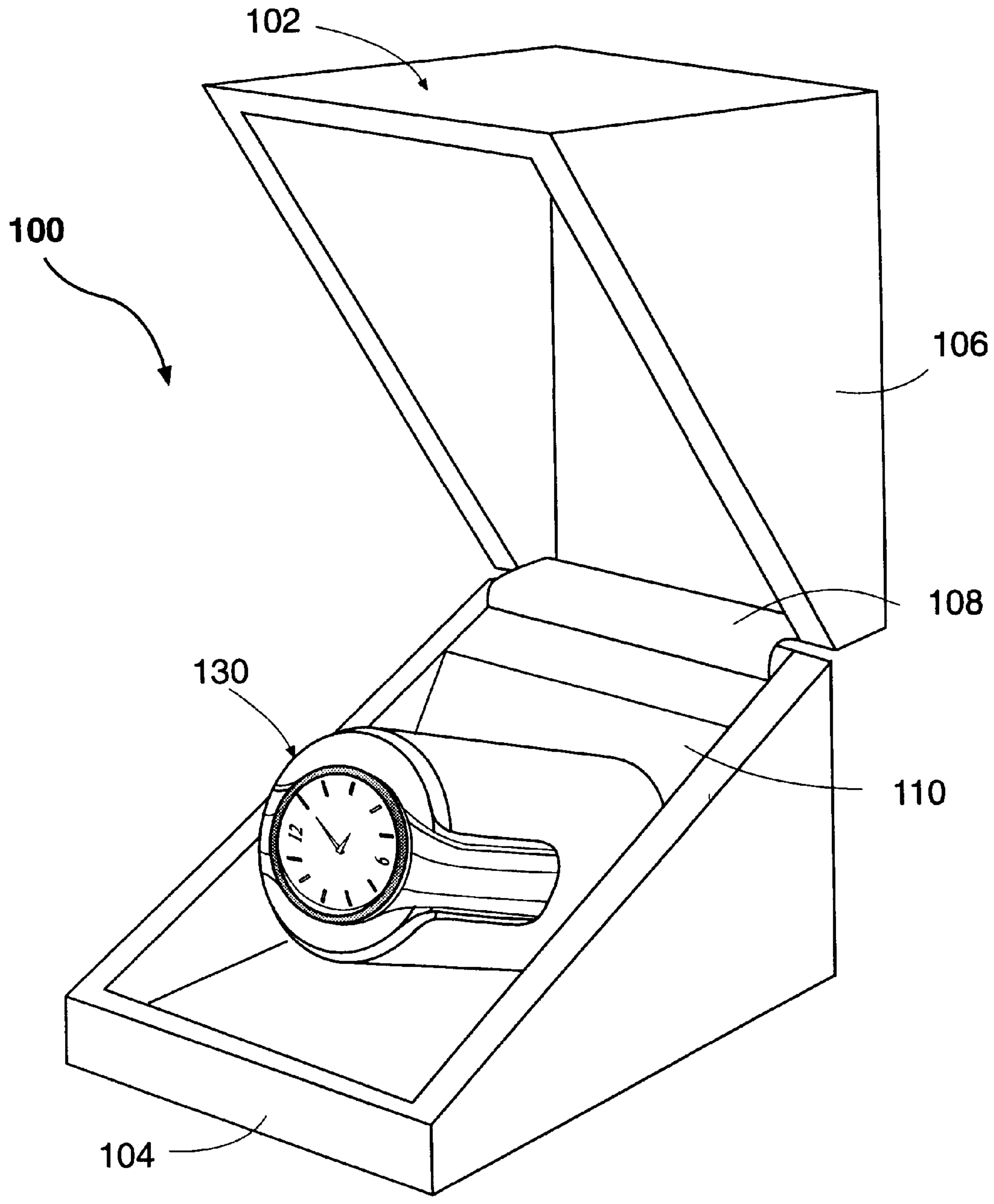
Figure 11:
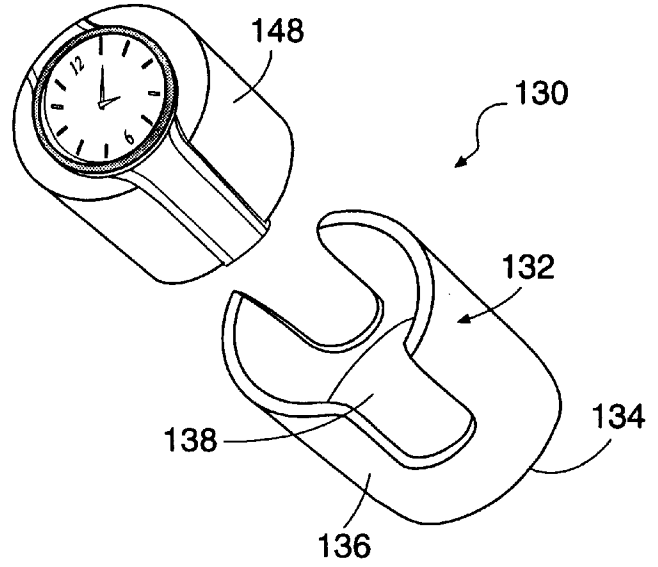
Figure 12:
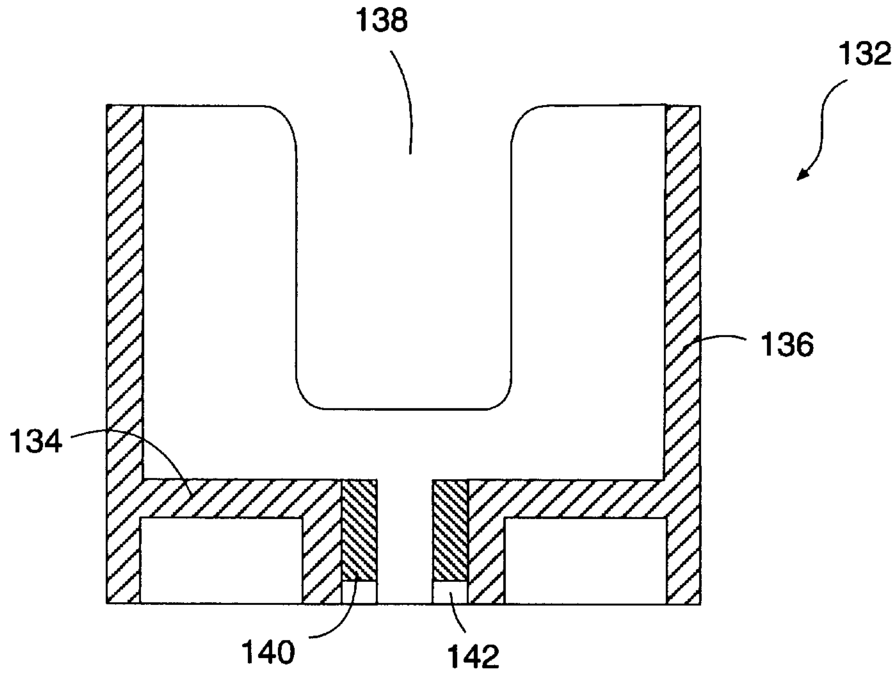

The cup type holder, shown in FIGS. 10–12, comprises a cup member 132 and a foam insert 148. The cup member 132 has a base 134 and cylindrical wall structure 136 of the cup member 132. Two diametrically opposed slots 138 are formed in the wall structure 136. A metal collar 140 is disposed in the base 134 of the cup member 132. The metal collar 140 is designed to fit over the drive spindle 152 and has two slots 142 that register with the drive pin 154 on the drive spindle 152.

The insert 148 also has a cylindrical configuration and is sized to fit into the cup member 132. The insert 148 is preferably made of a soft foam material and is slightly larger than the cup member 132 so that it is held in the cup member 132 by friction.

To use the cup type holder 130, the insert 148 is removed from the cup member 132. The watch is placed on the insert 148 with the face of the watch is disposed on the outwardly facing surface of the insert 148 and the band extending around the sides and back of the insert 148. The insert 148 is then placed back into the cup member 132. The slots 138 in the cup member 132 reduce the chance of the band being scratched.

Both types of holders 120, 130 are designed to be easily removed from the spindle 152 by simply lifting the holder 120,130 off of the drive spindle 152. This allows the use of several different holders 120, 130. When removed from the spindle 152, the holders 120, 130 will sit upright on their base in a storage position. A watch owner having several different watches can place each watch on an individual holder 120, 130. When one watch needs rewinding, the user simply removes the holder 120, 130 on the device and replaces it with a different holder 120, 130 holding a different watch. The watch holder 120, 130 can be removed without turning off the motor 150. The slip clutch 160 protects the motor 150 from damage.

During operation, the lid 104 of the case 102 can be closed. When the lid 104 is closed, excess heat produced by the motor 150 is trapped in the case 102. This heat prevents the watch lubricant from congealing and also prevents formation of condensation in the watch itself.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An orbital watch winder for a watch including a self-winding mechanism that swings back and forth in an arc, said watch winder comprising:

a) a base;

b) a generally cylindrical mandrel mounted to said base for rotation about an axis, said axis being disposed at an angle with respect to a horizontal plane;

c) said mandrel having a generally cylindrical outer surface on which a watch body is supported so that the watch body is radially spaced from the axis of rotation of the mandrel and follows a circular orbit around said axis as said mandrel rotates, said watch body being disposed generally tangent to said circular orbit to cause the self-winding mechanism in said watch body to swing back and forth in an arc; and d) a drive motor for rotating said mandrel with the watch body supported thereon.

2. The orbital watch winder of claim 1 herein the axis of rotation of said mandrel is disposed at an angle of approximately 30° from a horizontal plane.

3. The orbital watch winder of claim 1 wherein the mandrel is removably mounted to the base.

4. The orbital watch winder of claim 1 wherein the outer surface of said mandrel is tapered.

5. The orbital watch winder of claim 1 wherein the outer surface of the mandrel is cylindrical.

6. The orbital watch winder of claim 1 wherein the outer surface of the mandrel is covered with a cushioning material.

7. The orbital watch winder of claim 1 further including a cycling control operatively connected to said drive motor for turning said drive motor on and off after predetermined intervals of time.

8. The orbital watch winder of claim 1 further including a slip clutch interposed between said drive motor and said mandrel so that said watch can be placed on and removed from said mandrel while said drive motor continues to operate without damaging said motor.

9. The orbital watch winder of claim 1 further including a case having a lid for enclosing said mandrel and said drive motor, wherein when said lid is closed, excess heat produced by said drive motor is trapped in said case.

10. A watch winder for winding a watch having a self-winding mechanism, comprising:

a) a case;

b) a watch holder rotatably mounted within said case;

d) a drive motor disposed within said case and operatively connected to said watch holder for rotating said watch holder with the watch supported thereon to wind said watch; and e) a slip clutch interposed between said drive motor and said watch holder so that said watch can be placed on and removed from said holder while said drive motor continues to operate without damaging said motor.

11. The watch winder according to claim 10 wherein said watch holder comprises a mandrel having an outer surface on which a watch body is supported so that the watch body is radially spaced from the axis of rotation of the mandrel.

12. The watch winder according to claim 10 wherein said watch holder comprises a cup member mounted for rotation about an axis and an insert that fits inside said cup member for supporting the watch.

13. The watch winder according to claim 10 wherein said watch holder is removably mounted within said case.

14. The watch winder according to claim 13 including a plurality of interchangeable watch holders.

15. The watch winder according to claim 10 wherein said case includes a lid that, when closed, traps excess heat produced by said motor within said case.

16. A method for keeping a self-winding watch wound when said watch is not being worn by a user comprising:

a) mounting said watch on a mandrel so that the watch body is radially spaced from the axis of rotation of said mandrel;

b) disposing the axis of rotation of the mandrel at an angle with respect to a horizontal plane; and c) rotating the mandrel with said watch mounted thereon such that said watch follows a circular orbit around said axis of rotation of said mandrel; and d) wherein said watch body is disposed generally tangent to said circular orbit to cause a self-winding mechanism in said watch body to swing back and forth through an arc as said watch rotates around said mandrel.

17. The method according to claim 16 wherein the axis of rotation is inclined at an angle of approximately 30° from a horizontal plane.

* * * * *